United States Patent
Kumar et al.

(10) Patent No.: US 11,100,057 B2
(45) Date of Patent: Aug. 24, 2021

(54) VIRTUAL FILE ORGANIZER

(71) Applicant: Citrix Systems, Inc., Fort Lauderdale, FL (US)

(72) Inventors: Ajay Kumar, Morrisville, NC (US); Gaurav Saraf, Apex, NC (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 123 days.

(21) Appl. No.: 16/434,851

(22) Filed: Jun. 7, 2019

(65) Prior Publication Data

US 2020/0387483 A1    Dec. 10, 2020

(51) Int. Cl.
*G06F 16/188* (2019.01)
*G06N 20/00* (2019.01)
*G06F 16/242* (2019.01)
*G06F 16/185* (2019.01)
*G06F 16/35* (2019.01)
*G06F 21/62* (2013.01)
*G06F 16/14* (2019.01)

(52) U.S. Cl.
CPC .......... *G06F 16/192* (2019.01); *G06F 16/152* (2019.01); *G06F 16/185* (2019.01); *G06F 16/243* (2019.01); *G06F 16/35* (2019.01); *G06F 21/6218* (2013.01); *G06N 20/00* (2019.01)

(58) Field of Classification Search
CPC .................................................. G06F 16/6218
See application file for complete search history.

(56) References Cited

U.S. PATENT DOCUMENTS

| | | | | |
|---|---|---|---|---|
| 2008/0256354 | A1* | 10/2008 | Blumenau | G06F 16/907 715/153 |
| 2014/0156665 | A1* | 6/2014 | Kraley | G06F 16/93 707/739 |
| 2014/0250492 | A1* | 9/2014 | Cooper | H04L 63/20 726/1 |
| 2016/0321705 | A1* | 11/2016 | Scheidelman | G06Q 30/0269 |

FOREIGN PATENT DOCUMENTS

WO    WO-2018180023 A1 * 10/2018 ............. G06F 16/00

* cited by examiner

*Primary Examiner* — William Spieler
(74) *Attorney, Agent, or Firm* — Hoffman Warnick LLC

(57) ABSTRACT

A virtual file organization system, method and program product are disclosed. Included is a system that assigns classification tags to files stored within a storage system based on a natural language processing (NLP) context analysis of each file; and a virtual smart folder that is viewable within a user interface, wherein: opening the virtual smart folder causes a set of virtual subfolders to be displayed in which each virtual subfolder includes a category title; opening of a virtual subfolder causes a set of files residing at disparate locations in the storage system to be displayed; and the files displayed by opening the virtual subfolder each include an assigned classification tag that is associated with the category title of the virtual subfolder.

20 Claims, 6 Drawing Sheets

VIRTUAL FILE ORGANIZER

BACKGROUND OF THE DISCLOSURE

With the cost of data storage continuing to decrease, including on premise storage and cloud storage facilities, enterprises and users are saving more and more data. As the number of files grow, organizing and locating files has become a challenge for users. While users may try to organize files in folders and subfolders, over time, keeping files organized and finding a file becomes less and less efficient. For example, loan documents for purchasing a property could be reasonably saved in a subfolder entitled "finance" just as reasonably as in a subfolder entitled "legal," or "deals."

When documents spread over a large file system need to be retrieved, users can be faced with a daunting task of hunting for files, which can be tremendously time consuming and inefficient. Common approaches available to users include search facilities that allow the user to search for file names or text within a document. However, if a user has not memorized specific keywords associated with the file names or content, searches can involve an extensive trial and error process.

BRIEF DESCRIPTION OF THE DISCLOSURE

Aspects of this disclosure provide a system, method and program product for provisioning a virtual file organizer that can organize and display disparately located files within a storage system. In particular, files are organized based on a natural language processing (NLP) context analysis of their contents, rather than their actual location in the storage system. In one approach, a back-end service analyzes the textual content of a file when it is stored and assigns one or more classification tags to the file. A virtual file organizer automatically groups and displays files from disparate locations from the storage system into virtual subfolders based on the classification tags. Each of the virtual subfolders includes a category name or title that allows for intuitive file locating. The classification tags can also be leveraged to enhance traditional keyword searching, and to enforce policy restrictions on different types of documents. Accordingly, a technical solution using NLP is provided to address the technical problems associated with retrieving disparately located files in a storage system.

A first aspect of the disclosure provides a virtual file organization system, which includes a system that assigns classification tags to files stored within a storage system based on a natural language processing (NLP) context analysis of each file and a virtual smart folder that is viewable within a user interface. Opening the virtual smart folder causes a set of virtual subfolders to be displayed in which each virtual subfolder includes a category title, and opening of a virtual subfolder causes a set of files residing at disparate locations in the storage system to be displayed. The files displayed by opening the virtual subfolder each include an assigned classification tag that is associated with the category title of the virtual subfolder.

A second aspect of the disclosure provides a method for provisioning a virtual file organizer, including: displaying a virtual smart folder within a user interface; displaying a set of virtual subfolders in response to opening the virtual smart folder, wherein each virtual subfolder includes a category title; displaying a set of files that are stored at disparate locations in a storage system in response to opening a virtual subfolder, wherein the files displayed by opening the virtual subfolder each include an assigned classification tag that is associated with the category title of the virtual subfolder. Classification tags are assigned to files in the storage system by performing a natural language processing (NLP) context analysis of each file.

A third aspect of the disclosure provides a computer program product stored on a computer readable storage medium, which when executed by a computing system, provisions a virtual file organizer, wherein the computer program product includes program code that displays a virtual smart folder within a user interface and program code that displays a set of virtual subfolders in response to opening the virtual smart folder. Each virtual subfolder includes a category title and program code displays a set of files that are stored at disparate locations in a storage system in response to opening a virtual subfolder. The files displayed by opening the virtual subfolder each include an assigned classification tag that is associated with the category title of the virtual subfolder and program code assigns classification tags to files in the storage system by performing a natural language processing (NLP) context analysis of each file.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for readily identifying and displaying disparately located files on a storage system. In one embodiment, virtual folders are generated that organize files disparately stored throughout a storage system based on a natural language processing (NLP) context analysis. Each virtual folder thus can be used to display a set files that are related based on context, but are not necessarily stored together.

Figure 1:
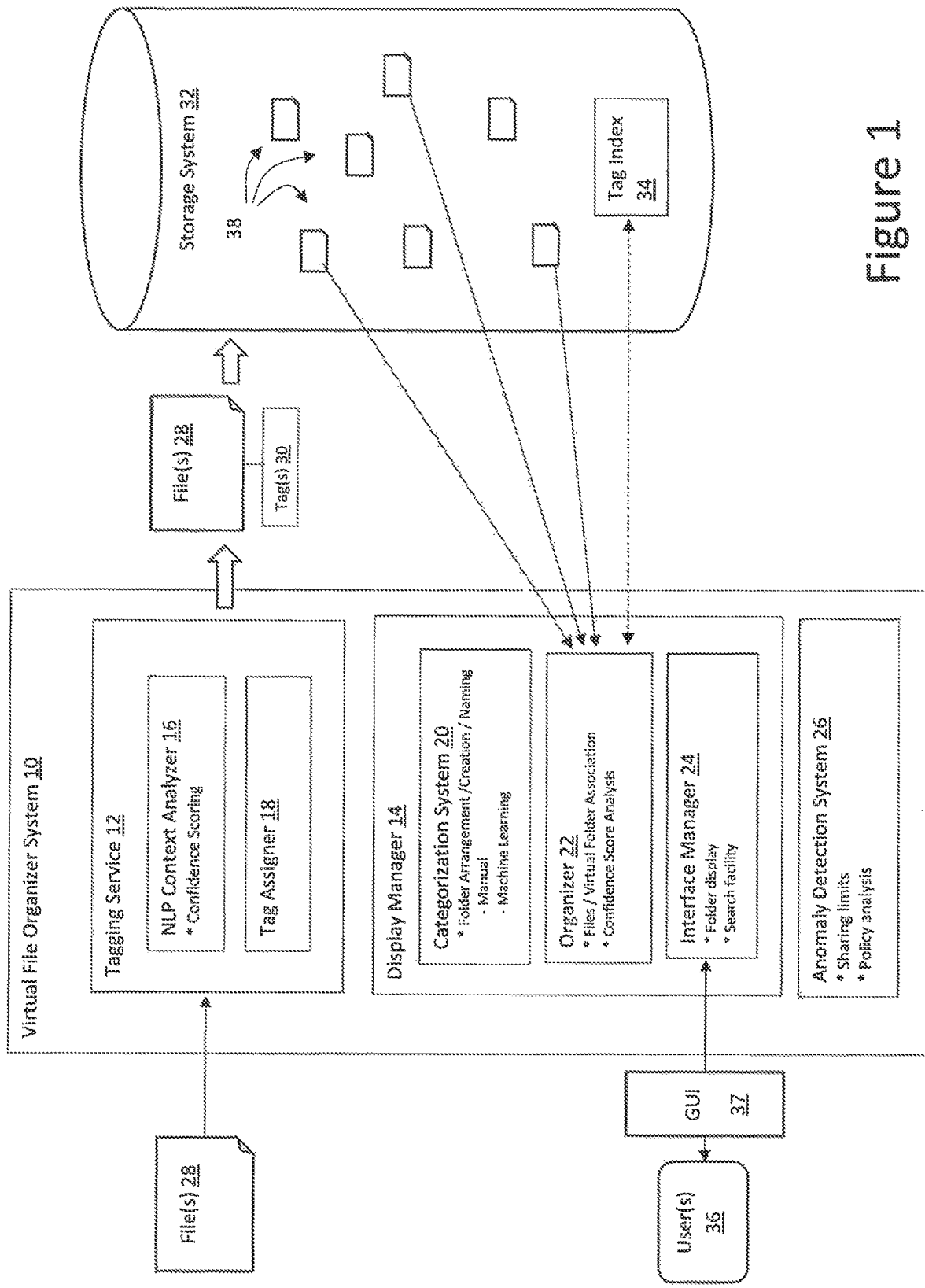
FIG. 1 is a block diagram of a virtual file organizer system, in accordance with an illustrative embodiment.

Referring to FIG. 1, an illustrative virtual file organization system 10 is shown that generally includes: a tagging service 12 for assigning classification tags 30 to files 28 being stored (or previously stored) in a storage system 32; a display manager 14 that organizes and renders virtual folders containing files 38 disparately stored throughout the storage system 32; and an anomaly detection system 24 that limits use of files based their context and a defined policy.

As shown, tagging service 12 utilizes an NLP context analyzer 16 to analyze each file 28 (e.g., a text based document) being stored to determine a context of the document. Based on the context, a tag assigner 18 assigns one or more classification tags 30 to the file 28. For example, a document comprising a contract between two parties for the sale of a business might be classified with the tags "legal" and/or "agreements." Any NLP technique may be utilized to analyze the textual content of the document and determine its context. For example, NLP context analyzer 16 may employ sentiment analysis, theme extraction, named entity extraction, n-gram techniques, noun phrase extraction, facet processing, automatic summarization, part-of-speech tagging, or any other available technique. Tag assigner 18 may for example select a classification tag 30 from a taxonomy of predefined tags that most closely matches the context. Confidence scoring may be utilized to rate how confident the tagging service 12 with the selected tag or tags 30.

More complex tagging arrangements for a file 28 could likewise be generated, e.g., a hierarchy of tags and scores could be generated, such as:

```
<Parent tags>
    <P.1> = "legal"
        <score> = 8.3
    <P.2> = "agreements"
        <score> = 7.5
<Child tags>
    <C.1> = "property sales"
        <score> = 8.8
    <C.2> = "bad deals"
        <score> = 5.8
```

In this case, the file 28 is assigned two parent tags ("legal" and "agreements") and two child tags ("property sales" and "bad deals"), along with associated confidence scores for each tag. Using such a hierarchy can later facilitate a more precise location of the file in a virtual folder space.

Regardless of the tagging approach, once a tag 30 is generated for a file 28, the file 28 and tag 30 are stored in storage system 32. While files are generally stored in a location specified by the user 36, tags 34 may either be stored with the associated files 38 or in a separate area such as in a table or tag index 34, which correlates tags with files 38.

As noted, when a user 36 wanted to find one of more of the files 38 using prior approaches, the user 36 would search through the existing file system structure and/or use a search facility to look for a keyword that matches a filename. In the current approach, display manager 14 provides a mechanism through which files are automatically located and organized in virtual folders based on their classification tags 30, such that files with similar context are grouped together.

In the embodiment of FIG. 1, display manager 14 includes a categorization system 20 that creates and names virtual folders, an organizer 22 that associates files with virtual folders, and an interface manager 24 for presenting virtual folders and files in a graphical user interface (GUI) 37.

Categorization system 20 can generate (i.e., create, arrange and name) virtual folders using any technique. In one embodiment, virtual folders may be named after tags, such that the virtual folder names are a super-set of all the tags used to name files for a user or group of users. In other embodiments, virtual folders can be generated manually, e.g., by an administrator, based on institutional knowledge. Alternatively, virtual folders can be generated automatically, e.g., using a machine learning tool. For example, machine learning can analyze data such as tagging information assigned to files, past search queries, usage patterns, file access history, tag usage, etc., to determine the most useful virtual folder presentation space. For example, top level virtual folders can be named after all the different tags assigned to files for a user 36. In subsequent levels, files can grouped into virtual subfolders based on a criteria, such as recently accessed, recommended (determined using a Recommendation Algorithm), date/time (e.g., files saved last week, last month etc.). Using machine learning, the presentation space, i.e., layout, hierarchy (e.g., subfolder tree structure), and names of virtual folders can be regenerated periodically (e.g., once a day, once a week, etc.), or be generated dynamically on the fly (e.g., anytime a user views a virtual folder). Further, the presentation of virtual folders can be user dependent, enterprise specific, time/date dependent, location dependent, behavior dependent, etc. For example, a first user 36 having a defined role in an organization might regularly deal for accounting related files, whereas a second user might regularly deal with technical files. In this case, the virtual folders presented to the first user might include names such as "Tax," "Accounts," "Budget," etc., whereas the virtual folders presented to the second user might include names such as "Testing," "Engineering," "Tech Support," etc.

Once the virtual folder structure is defined, organizer 22 associates files 38 in the storage system 32 with different virtual folders based on the classification tags 30 associated with each file 38. In a simple embodiment, the generated tags 30 may directly link to a folder name, e.g., organizer 22 can return all the files that contain a tag 30 having the same name as a specified virtual folder. For example, a tag 30 "Tax" assigned to a given file 28 could cause the file 28 to be associated with the virtual folder entitled the same. In more advanced embodiments, tags 30 (and associated files 38) can be linked to virtual folders using a rules based or learning algorithm. For example, the tag "schematics" assigned to a file could be linked with the virtual folder name "Engineering" based on a predefined rule that associates a set of tags to a virtual folder. Further, more complex tags, such as the hierarchical tags described herein, can be used to associate files with virtual subfolder, sub-subfolders, etc. For instance, if both a parent and child tag exist, organizer 22 may locate the file to a sub-subfolder that maps to the parent/child tags. Additionally, the process of associating tags 30 to virtual folders can utilize tag index 34 to quickly identify which tags/files 38 belong to which virtual folders. For example, if a user open a virtual folder entitled "legal", the tag index 34 could provide a list of all files 38 associated with that tag. Depending on the implementation, associating files 38 with virtual folders can be done dynamically on the fly whenever a user attempts to view the contents of a virtual folder, or be done using a static look-up table that is regularly updated.

Additionally, the process of associating files 38 to virtual folders can utilize confidence scores calculated by the NLP context analyzer 16. Thus, for example, each virtual folder may be implemented to only include files having a confidence score above a particular threshold. Alternatively, virtual folders may be implemented to contain no more than a maximum number of files, e.g., only include the best 20 files based on confidence score. Still further, the process of associating files to virtual folders can be refined based on the user, enterprise, location, time, behavior, or any other parameter. For example, executive level personnel in a large organization may have refined settings such that their virtual folders not include files having low confidence scores, while engineers in the organization have no such limitations.

Once the virtual folders are created and associated with files 38, interface manager 24 can be deployed to display the virtual folders and files to users 36 via a GUI 37. In one illustrative embodiment, the virtual folders are displayed in an existing operating system or web application file explorer window along with actual folders available to the user 36. Thus, in a file explorer window, the user 36 will simply see an additional root folder (e.g., entitled Virtual Smart Folder) that the user can click on. When the root folder is opened, a set of named virtual subfolders are presented. When a virtual subfolder is opened, files associated with the subfolder are displayed. In more complex cases, a hierarchy of virtual subfolders and files can be displayed. Additionally, a search interface may likewise be available to the user 36 to enter keywords to search for classification tags 30, which will return a set of files. Interface manager 24 may for example be implemented by exposing a REST API (application programming interface) endpoint, which relies on HTTP requests to return a set of virtual subfolders containing the user's files.

In addition, virtual file organizer system 10 may include an anomaly detection system 26 that can set sharing limits for files 38 based on tags assigned to the files and a defined policy. For example, the policy might dictate that users 36 should not email financial documents outside of the enterprise. Accordingly, any files 38 having tags that include or are associated with "finance," can be flagged and barred from external email actions.

Figure 2:
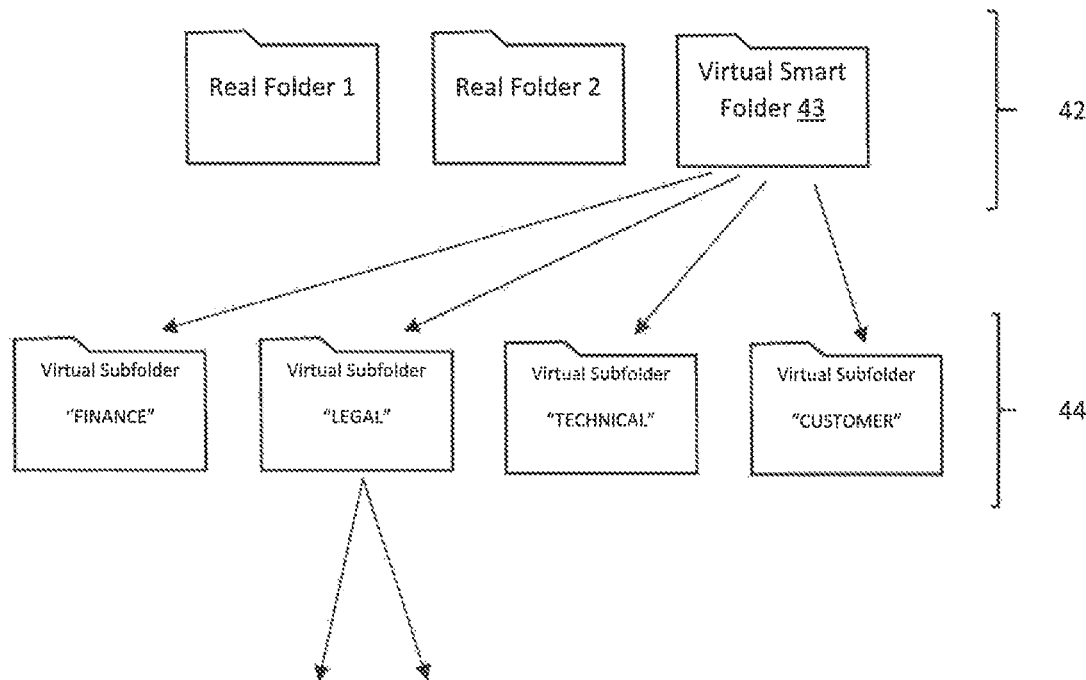
FIG. 2 is an illustrative user interface for viewing files, in accordance with an illustrative embodiment.

FIG. 2 depicts a simple example of a file explorer interface 40 presented to a user 36. The first display 42 may simply show three folders, two real folders and a virtual smart folder 43. If the user opens the virtual smart folder 43, a second display 44 is presented that includes four virtual subfolders, in the case named FINANCE, LEGAL, TECHNICAL and CUSTOMER. If the user then opens the LEGAL subfolder, a third display 46 is presented, which shows a set of files associated with the selected virtual subfolder. In this example, four files are shown named Lease A, Contract 1.3, LOI, and Due Diligence, along with dates, actual file locations and size. Note that the files each actually are stored at disparate locations in the storage system. For instance, Lease A actually resides at D:/real estate/, while Contract 1.3 resides at F:/Agreements/, etc. When the user selects a file to open, a pointer to the actual location of the file is used to retrieve and display the file making it appear as though the file actually is stored in the virtual subfolder. The virtual subfolders thus provide a mechanism for virtually grouping disparately located files into one common location based on a common context determined by the NLP context analyzer 16 (FIG. 1).

In a further embodiment, files could be stored in a flat file space with little or no organization. When a user seeks to view files, the display manager 14 will automatically organize files into virtual folders as described herein. Additionally, it is understood that any number of virtual sub-subfolders could likewise be incorporated that would be accessible via one or more of the virtual subfolders.

Figure 3:
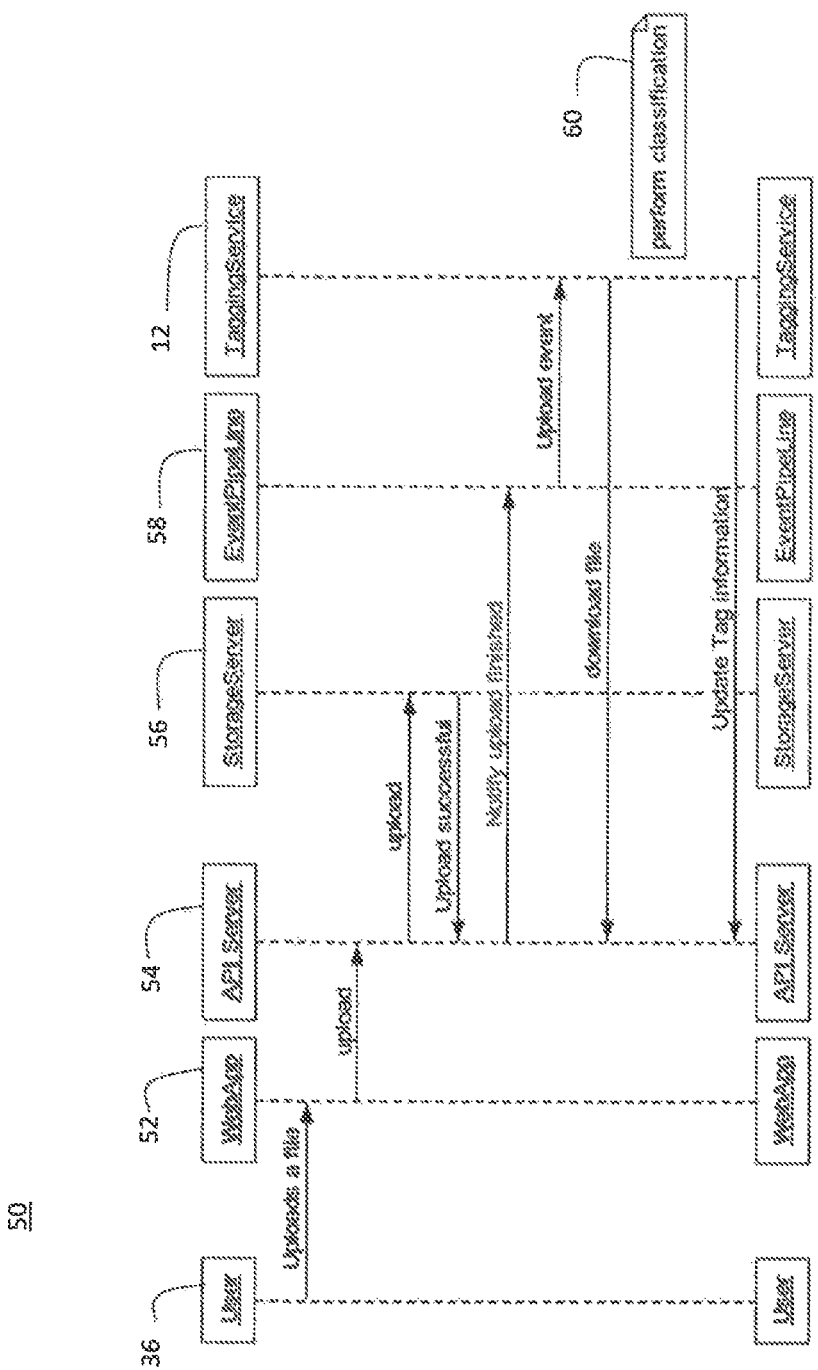
FIG. 3 is a diagram showing a cloud process for storing files and assigning classification tags, in accordance with an illustrative embodiment.

FIG. 3 depicts a process diagram for storing and tagging files in a cloud based environment 50. In this embodiment, a user 36 uploads a file to a Web App 52, which causes the file to be uploaded to an API server 54 and a storage server 56, which reports the upload as successful. An event pipeline 58 then receives a notification when the upload is finished and the event is uploaded to the tagging service 12. The tagging service 12 performs a classification 60 on the file using NLP context analysis and the tagging event information is reported back to the API server 54, along with the file information for storage, e.g., in a tag index 34 (FIG. 1).

Figure 4:
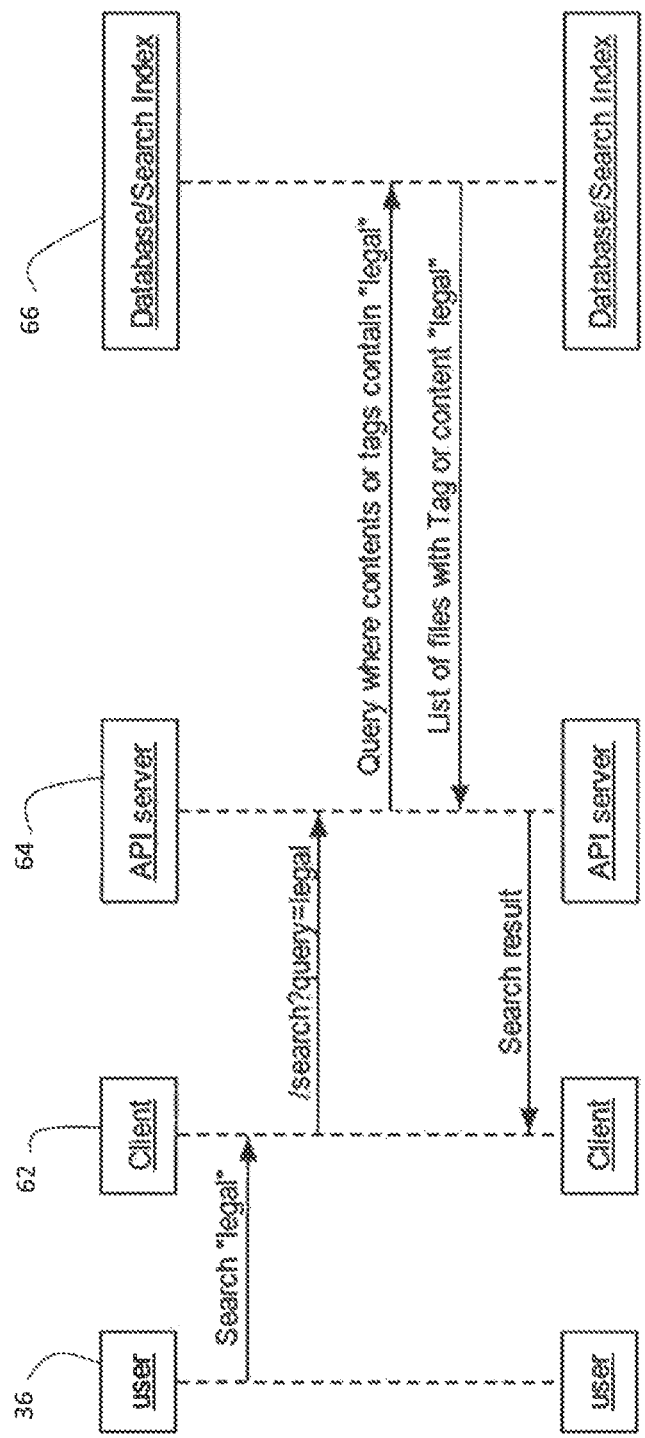
FIG. 4 depicts a diagram showing a cloud process for searching for files, in accordance with an illustrative embodiment.

FIG. 4 depicts a process diagram for searching for disparately located files that share a common context. In the case, the user 36 enters a keyword (e.g., "legal") or opens a virtual folder named "legal" at a client 62. The client forwards the query to an API server 64, which queries a database/search index (e.g., the tag index 34). Files that have an associated tag or contents that match the query are returned to the API server 64, which in turn displays the search results back to the client 62.

Figure 5:
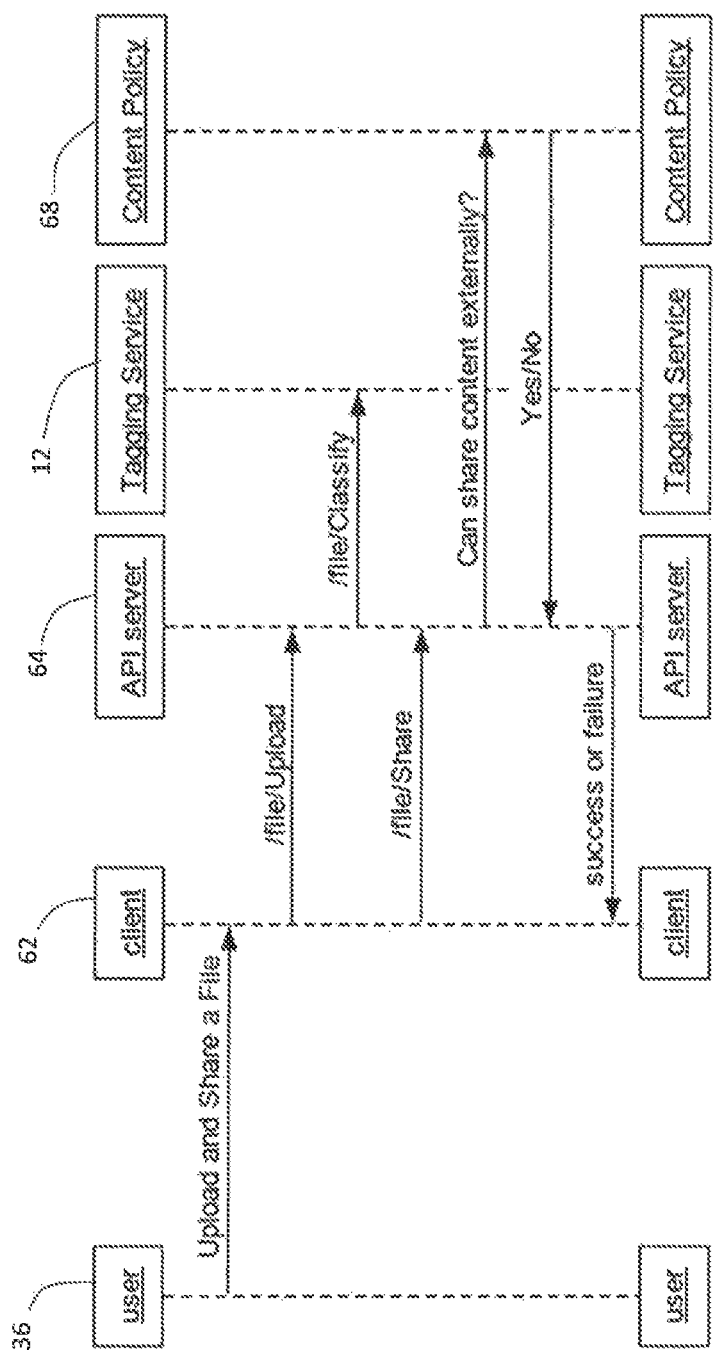
FIG. 5 depicts a diagram showing a cloud process providing anomaly detection, in accordance with an illustrative embodiment.

FIG. 5 depicts a process diagram involving anomaly detection. In this case, the user 36 uploads a file to a client 62 for sharing, which uploads the file to an API server 64. The API server 64 engages the tagging service 12 to classify the file (e.g., with one or more tags). When the API server 64 attempts to share the file (e.g., via an email service), the content policy 68 is checked by the API server 64 to see if the file can be shared externally based on the tags. A success or failure in trying to share is then returned to the client 62. If a failure is returned, the user is notified that sharing the file is prohibited.

Figure 6:
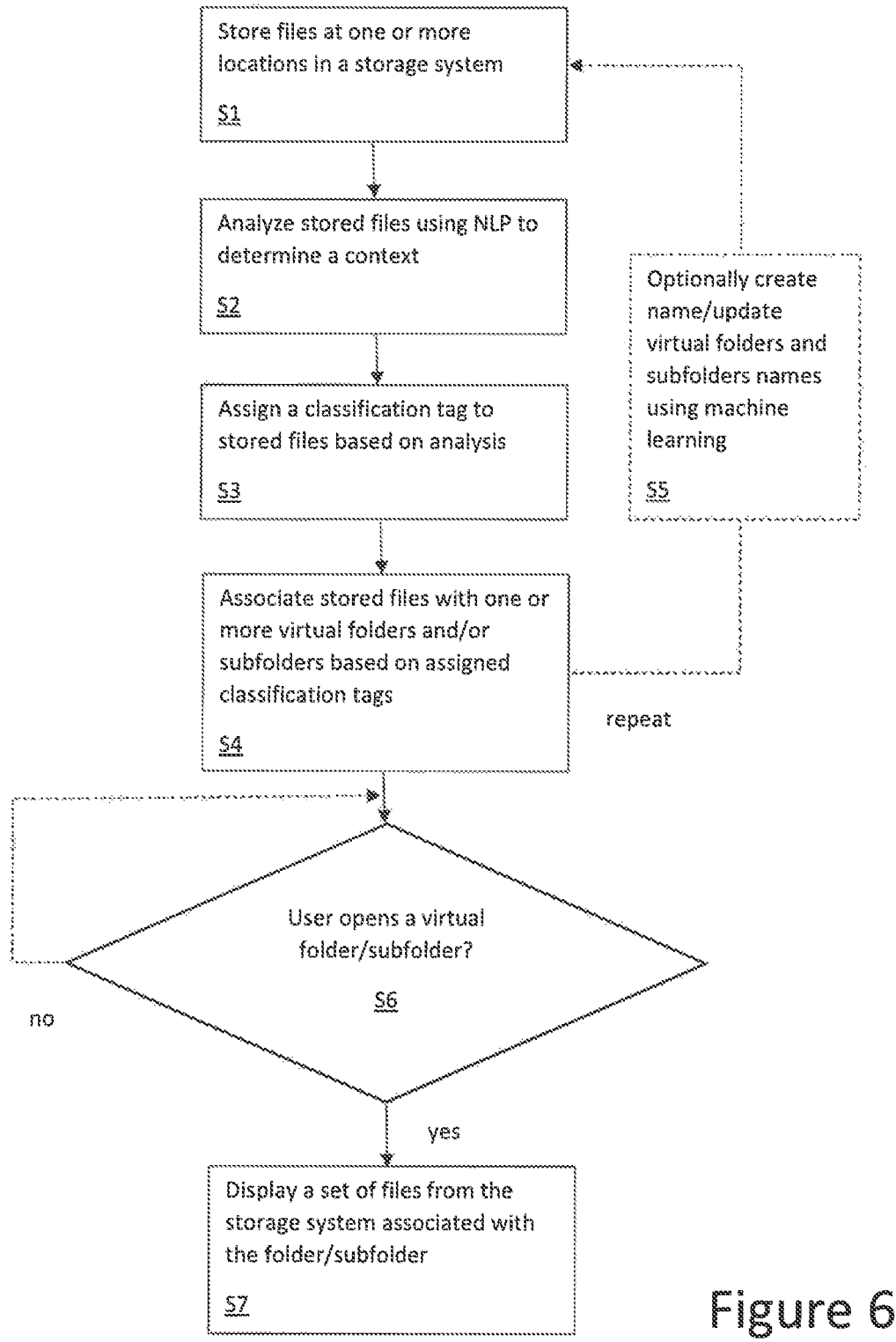
FIG. 6 depicts a flow diagram of a process for provisioning a virtual file organizer system, in accordance with an illustrative embodiment.

FIG. 6 depicts a flow diagram of a process for provisioning virtual file organizer system 10 (with reference to FIG. 1). At S1, files 38 are stored in one or more locations in a storage system 32. Files may for example be saved and stored in a typical manner in existing or newly created folders and subfolders based on user selections, knowledge, preferences, etc. Alternatively, files may be stored in an ad hoc manner such as in a flat file space or the like. At S2, files 38 are analyzed using NLP to determine a context and at S3, classification tags 30 are assigned to files based on the NLP analysis. At S4, the stored files 38 are associated with one or more virtual folders and/or subfolders based on the assigned classification tags. Processes S1-S4 continuously repeat as new files are added to (or updated within) the storage system 32. Optionally, at S5, virtual folders and subfolders can be created, named and updated using machine learning. For example, if the use of a classification tag becomes more prolific over time, a machine learning system can recognize that fact and create a new virtual folder for files having that tag.

At S6, the system monitors for any users 36 opening a virtual folder or subfolder. In response to a user opening a virtual folder or subfolder at S6, the system displays a set of files at S7 from the storage system 32 are that associated with the virtual folder or subfolder being opened. Note that the process at S4 of associating stored files with one or more virtual folders and/or subfolders based on assigned classification tags could be fully or partially performed after a user opens a virtual folder or subfolder. For instance, when a user opens a virtual subfolder, the system could dynamically search for and assign files to the selected virtual folder on the fly.

Virtual file organization system 10 (FIG. 1) may for example be implemented by a cloud computing environment that employs a network of remote, hosted servers to manage, store and/or process data, and may generally be referred to, or fall under the umbrella of, a "network service." The cloud computing environment may include a network of interconnected nodes, and provide a number of services, for example hosting deployment of customer-provided software, hosting deployment of provider-supported software, and/or providing infrastructure. In general, cloud computing environments are typically owned and operated by a third-party organization providing cloud services (e.g., Amazon Web Services, Microsoft Azure, etc.), while on-premises computing environments are typically owned and operated by the organization that is using the computing environment. Cloud computing environments may have a variety of deployment types. For example, a cloud computing environment may be a public cloud where the cloud infrastructure is made available to the general public or particular sub-group. Alternatively, a cloud computing environment may be a private cloud where the cloud infrastructure is operated solely for a single customer or organization or for a limited community of organizations having shared concerns (e.g., security and/or compliance limitations, policy, and/or mission). A cloud computing environment may also be implemented as a combination of two or more cloud environments, at least one being a private cloud environment and at least one being a public cloud environment. Further, the various cloud computing environment deployment types may be combined with one or more on-premises computing environments in a hybrid configuration.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Virtual file organization system 10 (FIG. 1) may comprise any type of computing device that for example includes at least one processor, memory, an input/output (I/O), e.g., one or more I/O interfaces and/or devices, and a communications pathway or bus. In general, the processor(s) execute program code which is at least partially fixed in memory. While executing program code, the processor(s) can process data, which can result in reading and/or writing transformed data from/to memory and/or I/O for further processing. The pathway provides a communications link between each of the components in the computing device. I/O can comprise one or more human I/O devices, which enable a user to interact with the computing device and the computing device may also be implemented in a distributed manner such that different components reside in different physical locations.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A virtual file organization system, comprising:
   a system that assigns classification tags to files stored within a storage system based on a natural language processing (NLP) context analysis of each file, wherein the NLP context analysis of each file includes calculating a confidence score regarding an accuracy of the assigned classification tag; and
   a virtual smart folder that is viewable as a folder icon within a file explorer window along with real folders, wherein:
      in response to being opened, the virtual smart folder is configured to cause a set of virtual subfolders to be displayed in which each virtual subfolder includes a category title;
      in response to being opened, a virtual subfolder is configured to cause a set of files stored at disparate locations in the storage system to be displayed, wherein the files displayed by opening the virtual subfolder each include an assigned classification tag that is associated with the category title of the virtual subfolder, and wherein each virtual subfolder displays no more than a maximum number of files based on the calculated confidence score for the classification tag assigned to each of the files.

2. The virtual file organization system of claim 1, wherein a classification tag is assigned to a file in response to the file being stored on the storage system.

3. The virtual file organization system of claim 1, wherein the storage system comprises a cloud storage system, wherein the category titles are determined using a machine learning algorithm.

4. The virtual file organization system of claim 1, further comprising a search facility that receives search terms and returns files based on classification tag matching.

5. The virtual file organization system of claim 1, further comprising an anomaly detection system that limits use of a file based on content policy and the assigned classification tag.

6. The system of claim 1, wherein each virtual subfolder is further limited to displaying only files with a classification tag that have a confidence score satisfying a threshold.

7. The system of claim 1, wherein a plurality of the files are assigned a hierarchy of classification tags including at least one parent tag and at least one child tag, and wherein the at least one parent tag and the at least one child tag is assigned a confidence score.

8. A method for provisioning a virtual file organizer, comprising:

displaying a virtual smart folder as a folder icon within a file explorer window along with real folders;

displaying a set of virtual subfolders in response to opening the virtual smart folder, wherein each virtual subfolder appears as a folder icon and includes a category title;

displaying a set of files that are stored at disparate locations in a storage system in response to opening a virtual subfolder, wherein each of the files displayed include an assigned classification tag that is associated with the category title of the virtual subfolder; and wherein classification tags are assigned to files in the storage system by performing a natural language processing (NLP) context analysis of each file, wherein the NLP context analysis of each file includes calculating a confidence score regarding an accuracy of the assigned classification tag.

9. The method of claim 8, wherein classification tags are assigned to files in response to files being stored on the storage system.

10. The method of claim 8, wherein the storage system comprises a cloud storage system, wherein the category titles are determined using a machine learning algorithm.

11. The method of claim 8, further comprising providing a search facility that receives search terms and returns files based on classification tag matching.

12. The method of claim 8, further comprising limiting a use of a file based on content policy and the assigned classification tag.

13. The method of claim 8, wherein each virtual subfolder is further limited to displaying only files with a classification tag that have a confidence score satisfying a threshold.

14. The method of claim 8, wherein a plurality of the files are assigned a hierarchy of classification tags including at least one parent tag and at least one child tag, and wherein the at least one parent tag and the at least one child tag is assigned a confidence score.

15. A computer program product stored on a computer readable storage medium, which when executed by a computing system, provisions a virtual file organizer, wherein the computer program product comprises:

program code that displays a virtual smart folder as a folder icon within a file explorer window along with real folders;

program code that displays a set of virtual subfolders in response to opening the virtual smart folder, wherein each virtual subfolder includes a category title;

program code that displays a set of files that are stored at disparate locations in a storage system in response to opening a virtual subfolder, wherein each of the files include an assigned classification tag that is associated with the category title of the virtual subfolder; and program code that assigns classification tags to files in the storage system by performing a natural language processing (NLP) context analysis of each file.

16. The computer program product of claim 15, wherein classification tags are assigned to files in response to files being stored on the storage system.

17. The computer program product of claim 15, wherein the storage system comprises a cloud storage system, wherein the category titles are determined using a machine learning algorithm.

18. The computer program product of claim 15, further comprising limiting a use of a file based on content policy and the assigned classification tag.

19. The computer program product of 15, wherein each virtual subfolder is further limited to displaying only files with a classification tag that have a confidence score satisfying a threshold.

20. The computer program product of claim 15, wherein a plurality of the files are assigned a hierarchy of classification tags including at least one parent tag and at least one child tag, and wherein the at least one parent tag and the at least one child tag is assigned a confidence score.

\* \* \* \* \*